(12) United States Patent
Infanti et al.

(10) Patent No.: US 8,483,771 B2
(45) Date of Patent: Jul. 9, 2013

(54) ACTUATOR ASSEMBLY AND ELECTRONIC DEVICE INCLUDING SAME

(75) Inventors: James Carl Infanti, Waterloo (CA); Firmansyah Kuncoko Sulem, Waterloo (CA); Kyung Won Park, Richmond Hill (CA)

(73) Assignee: Research In Motion Limited, Waterloo (CA)

( * ) Notice: Subject to any disclaimer, the term of this patent is extended or adjusted under 35 U.S.C. 154(b) by 462 days.

(21) Appl. No.: 12/854,218

(22) Filed: Aug. 11, 2010

(65) Prior Publication Data

US 2012/0040721 A1  Feb. 16, 2012

(51) Int. Cl.
*H04B 1/38* (2006.01)

(52) U.S. Cl.
USPC .......................................... 455/566; 310/311

(58) Field of Classification Search
USPC  455/566, 556.1; 310/311, 367, 361; 381/173, 381/190; 345/173
See application file for complete search history.

(56) References Cited

U.S. PATENT DOCUMENTS

| 4,011,474 A | 3/1977 | O'Neill |
| 6,739,182 B2 | 5/2004 | Mueller et al. |
| 2006/0082254 A1 | 4/2006 | Kita |
| 2006/0250377 A1* | 11/2006 | Zadesky et al. ............... 345/173 |
| 2008/0280657 A1 | 11/2008 | Maenpaa et al. |
| 2009/0026889 A1 | 1/2009 | Wolfer et al. |
| 2009/0072662 A1* | 3/2009 | Sadler et al. .................. 310/319 |
| 2009/0244013 A1 | 10/2009 | Eldershaw |
| 2010/0156843 A1 | 6/2010 | Paleczny |
| 2010/0246863 A1* | 9/2010 | Onishi et al. .................. 381/190 |

FOREIGN PATENT DOCUMENTS

WO  WO 03047007  6/2003

OTHER PUBLICATIONS

Extended European Search Report, EP10172527.3; Apr. 7, 2011.

* cited by examiner

*Primary Examiner* — Tu X Nguyen
(74) *Attorney, Agent, or Firm* — Ridout & Maybee LLP (57) ABSTRACT

An actuator assembly for use in an electronic device is provided. The actuator assembly includes a support tray formed of a conductive metal and defining an aperture extending through the support tray. A seat surrounds the aperture and supports an actuator. The actuator includes a piezoelectric element adhered to a metal substrate larger than the piezoelectric element. The metal substrate bends when the piezoelectric element contracts and expands in response to changes in the charge of the piezoelectric element. An insulator is disposed between the metal substrate and the support tray which electrically insulates the substrate from the metal substrate.

14 Claims, 9 Drawing Sheets

ACTUATOR ASSEMBLY AND ELECTRONIC DEVICE INCLUDING SAME

TECHNICAL FIELD

The present disclosure relates to an actuator assembly for providing tactile feedback in an electronic device that includes a touch-sensitive input device.

BACKGROUND

Electronic devices, including portable electronic devices, have gained widespread use and may provide a variety of functions including, for example, telephonic, electronic text messaging and other personal information manager (PIM) application functions. Portable electronic devices can include several types of devices including mobile stations such as simple cellular phones, smart phones, Personal Digital Assistants (PDAs), and laptop computers.

Devices such as PDAs or smart phones are generally intended for handheld use and ease of portability. Smaller devices are generally desirable for portability. Touch-sensitive devices constructed of a display, such as a liquid crystal display (LCD), with a touch-sensitive overlay are useful on such handheld devices as such handheld devices are small and are therefore limited in space available for user input and output devices. Further, the screen content on the touch-sensitive devices can be modified depending on the functions and operations being performed.

Tactile feedback for such touch-sensitive input devices provides a positive confirmation of, for example, touch selection. The provision and control of tactile feedback in touch-sensitive devices is desirable.

DETAILED DESCRIPTION OF EXAMPLE EMBODIMENTS

The following describes an actuator assembly for use in an electronic device. The actuator assembly includes a support tray formed of a conductive metal and defining an aperture extending through the support tray. A seat surrounds the aperture and supports an actuator. The actuator includes a piezoelectric element adhered to a metal substrate larger than the piezoelectric element. The metal substrate bends when the piezoelectric element contracts and expands in response to changes in the charge of the piezoelectric element. An insulator is disposed between the metal substrate and the support tray which electrically insulates the substrate from the metal substrate. The electronic device includes a housing, a touch-sensitive input device exposed by the housing, and an actuator assembly. The actuator assembly is housed in the housing and connected to the touch-sensitive input device.

In accordance with one embodiment, there is provided an actuator assembly for use in an electronic device, comprising: a support tray defining an aperture extending through the support tray, the support tray being formed of a conductive metal and including a seat surrounding the aperture; an actuator supported on the seat of the support tray, the actuator including a piezoelectric element adhered to a metal substrate larger than the piezoelectric element, the metal substrate bending when the piezoelectric element contracts and expands in response to changes in the charge of the piezoelectric element; and an insulator disposed between the metal substrate and the support tray which electrically insulates the substrate from the metal substrate.

In at least some embodiments, the actuator assembly further comprises a piezoelectric driver connected to the piezoelectric element for controlling a charge of the piezoelectric element. The piezoelectric element contracts in response to increases in charge and expands in response to decreases in charge. The actuator assembly may also include a cover covering the actuator and connected to the support tray. A portion of the cover being movable relative to the support tray when the actuator is actuated. The metal substrate of the actuator bends and applies a force to the cover so that the cover moves away from a rest position and away from the support tray in response to increases in charge of the piezoelectric element. The cover moves towards the rest position and support tray in response to decrease in charge of the piezoelectric element.

In some embodiments, the cover includes first and second portions connected by a flexible connection. The first portion is connected to the support tray and the second portion is the portion that is moveable relative to the support tray. The first portion may comprise side rails with a respective one of the side rails on each side of the first portion and connected to the first portion by spring arms. The spring arms may comprise thin portions of metal connecting the first and second portions. The first portion is welded to the support tray.

In at least some embodiments, a force sensor is spaced laterally from the actuator. The force sensor may comprise a plurality of force sensors, each spaced laterally from the actuator. The force sensors may be disposed on an opposite side of the support tray relative to the actuator. The force sensors may be disposed between the support tray and a base.

In some embodiments, the actuator assembly includes a plurality of force sensors, each of the force sensors being spaced laterally from each of a plurality of piezoelectric disk actuators. The force sensors may be disposed on an opposite side of the support tray relative to the piezoelectric disk actuators. The actuator assembly may comprise a plurality of resilient plungers, wherein respective resilient plungers are disposed between each force sensor and the support tray. The respective resilient plungers may be disposed between each actuator and the cover.

In some embodiments, the actuator assembly includes a printed circuit board, at least partially disposed between the support tray and the cover. The printed circuit board may be a flexible printed circuit board. The printed circuit board may be connected to the actuator to provide an electrical connection for controlling the actuator. The printed circuit board may be connected to the force sensor to provide an electrical connection thereto.

In accordance with another embodiment, there is provided an electronic device comprising: a housing; a processor received in the housing; a touch-sensitive display connected to the processor and exposed by the housing; and an actuator assembly as described herein, the actuator assembly housed in the housing and connected to the touch-sensitive display.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limited to the scope of the example embodiments described herein.

The actuator assembly provides a relatively thin device to provide desirable tactile feedback, for example, to simulate actuation of a dome switch upon touching or upon application of an external force to the touch-sensitive display, confirming receipt of input to the user. The tactile feedback provides a positive response and reduces the chance of input errors such as double entry, decreasing use time and increasing user-satisfaction. The actuator assembly includes a metal actuator sheet that facilitates grounding of the touch-sensitive display that is disposed on the actuator sheet. The actuator sheet facilitates pre-loading of the actuator assembly during production of the actuator assembly. The tolerance of the actuator assembly may be controlled to a tight tolerance at a lower cost by comparison to ensuring very tight tolerances for all individual parts. The force sensors are laterally spaced from the actuators in the support tray such that a preload on the force sensors, which is the load on the force sensors absent an externally applied force by a user pressing on the touch-sensitive display, may differ from a preload on the actuators. Thus, the preload on the force sensors and the actuators may be separately controlled.

Figure 1:
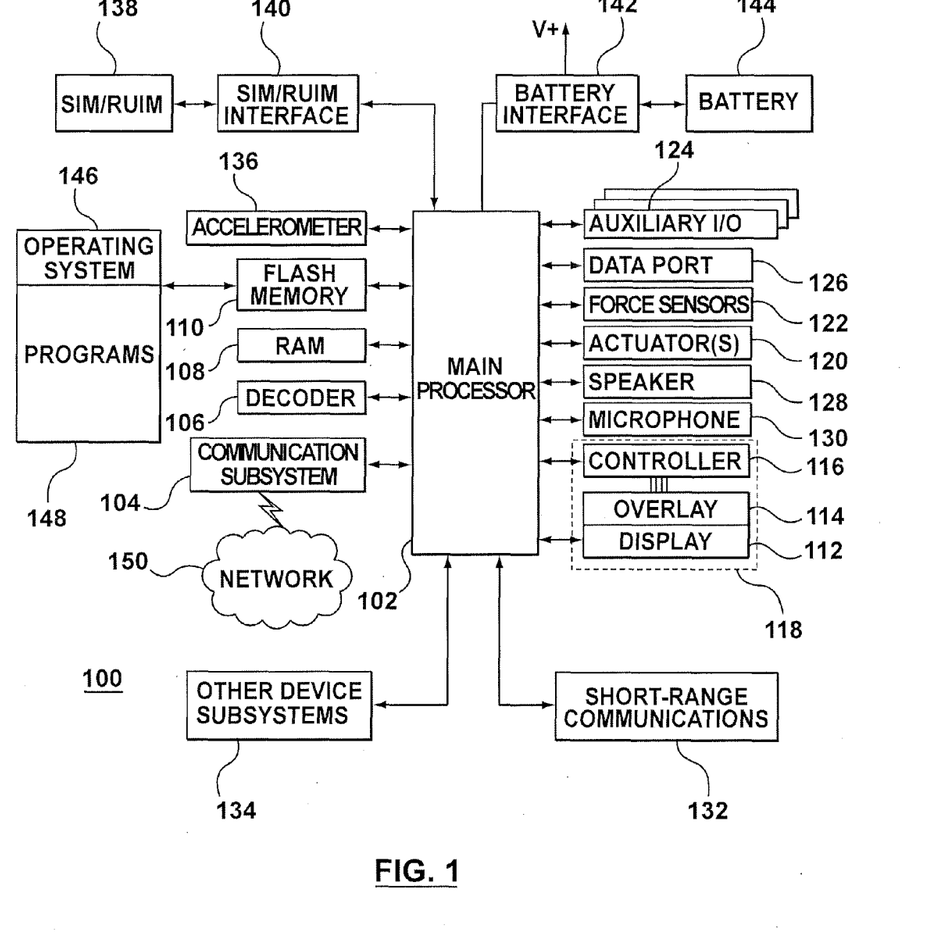
FIG. 1 is a simplified block diagram of components including internal components of a portable electronic device according to an example embodiment.

Example embodiments of the actuator assembly described herein are utilized in an electronic device such as a portable electronic device that includes a touch-sensitive display. FIG. 1 shows a simplified block diagram of components including internal components of a portable electronic device according to an example embodiment.

The portable electronic device 100 includes multiple components such as a processor 102 that controls the operations of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data-centric wireless networks, voice-centric wireless networks, and dual-mode networks that support both voice and data communications over the same physical base stations. The portable electronic device 100 is a battery-powered device and includes a battery interface 142 for receiving one or more rechargeable batteries 144.

The processor 102 also interacts with additional subsystems such as a Random Access Memory (RAM) 108, a flash memory 110, a display 112 with a touch-sensitive overlay 114 connected to an electronic controller 116 that together comprise a touch-sensitive display 118, actuators 120, force sensors 122, an auxiliary input/output (I/O) subsystem 124, a data port 126, a speaker 128, a microphone 130, short-range communications 132 and other device subsystems 134. User-interaction with the graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may also interact with an accelerometer 136 as shown in FIG. 1. The accelerometer 136 may include a cantilever beam with a proof mass and suitable deflection sensing circuitry. The accelerometer 136 may be utilized for detecting direction of gravitational forces or gravity-induced reaction forces.

To identify a subscriber for network access according to the present embodiment, the portable electronic device 100 uses a Subscriber Identity Module or a Removable User Identity Module (SIM/RUIM) card 138 inserted into a SIM/RUIM interface 140 for communication with a network such as the wireless network 150. Alternatively, user identification information may be programmed into the flash memory 110.

The portable electronic device 100 also includes an operating system 146 and software components 148 that are executed by the processor 102 and are typically stored in a persistent store such as the flash memory 110. Additional applications may be loaded onto the portable electronic device 100 through the wireless network 150, the auxiliary I/O subsystem 124, the data port 126, the short-range communications subsystem 132, or any other suitable device subsystem 134.

In use, a received signal such as a text message, an e-mail message, or web page download is processed by the communication subsystem 104 and input to the processor 102. The processor 102 then processes the received signal for output to the display 112 or alternatively to the auxiliary I/O subsystem 124. A subscriber may also compose data items, such as e-mail messages, for example, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

Figure 2:
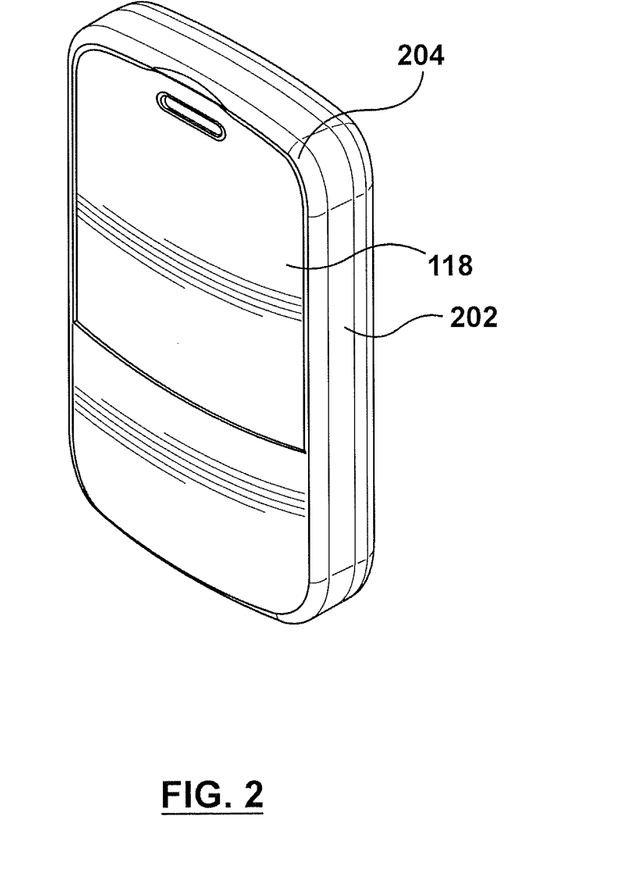
FIG. 2 is a perspective view of an example of a portable electronic device.

FIG. 2 is a perspective view of an example of a portable electronic device 100. The portable electronic device 100 includes a housing 202 that is suitable for housing the internal components shown in FIG. 1. The housing includes a frame 204 that frames the touch-sensitive display 118 for user-interaction with the touch-sensitive display 118. Although not shown in the figures, the portable electronic device 100 of FIG. 2 may also include a physical keyboard (not shown) such that the processor 102 (shown in FIG. 1) interacts with the keyboard and the housing 202 is constructed to accommodate the keys of the keyboard.

Figure 3:
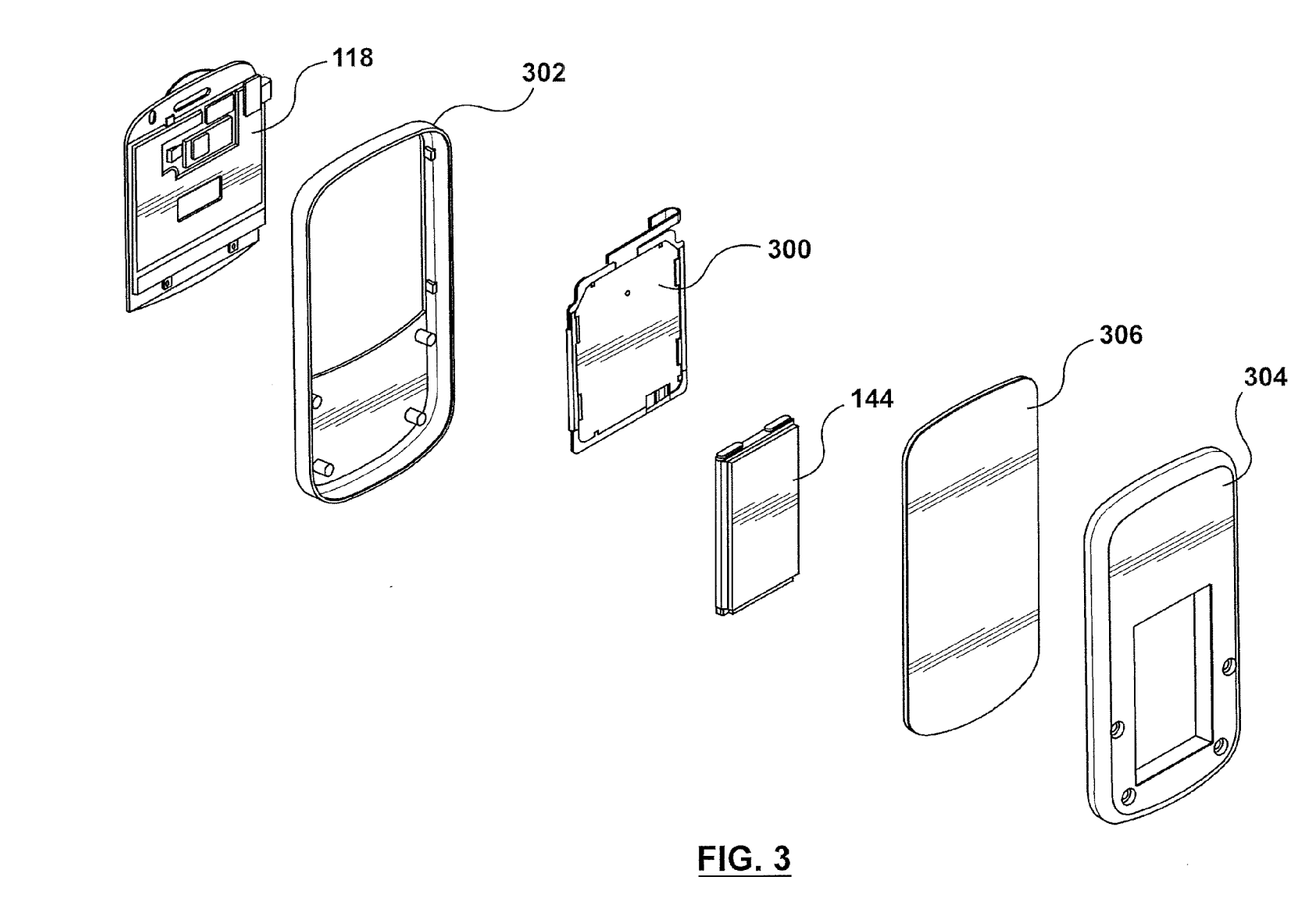
FIG. 3 is an exploded view of portions of the portable electronic device of FIG. 2, including an actuator assembly in accordance with an example embodiment.
Figure 4:
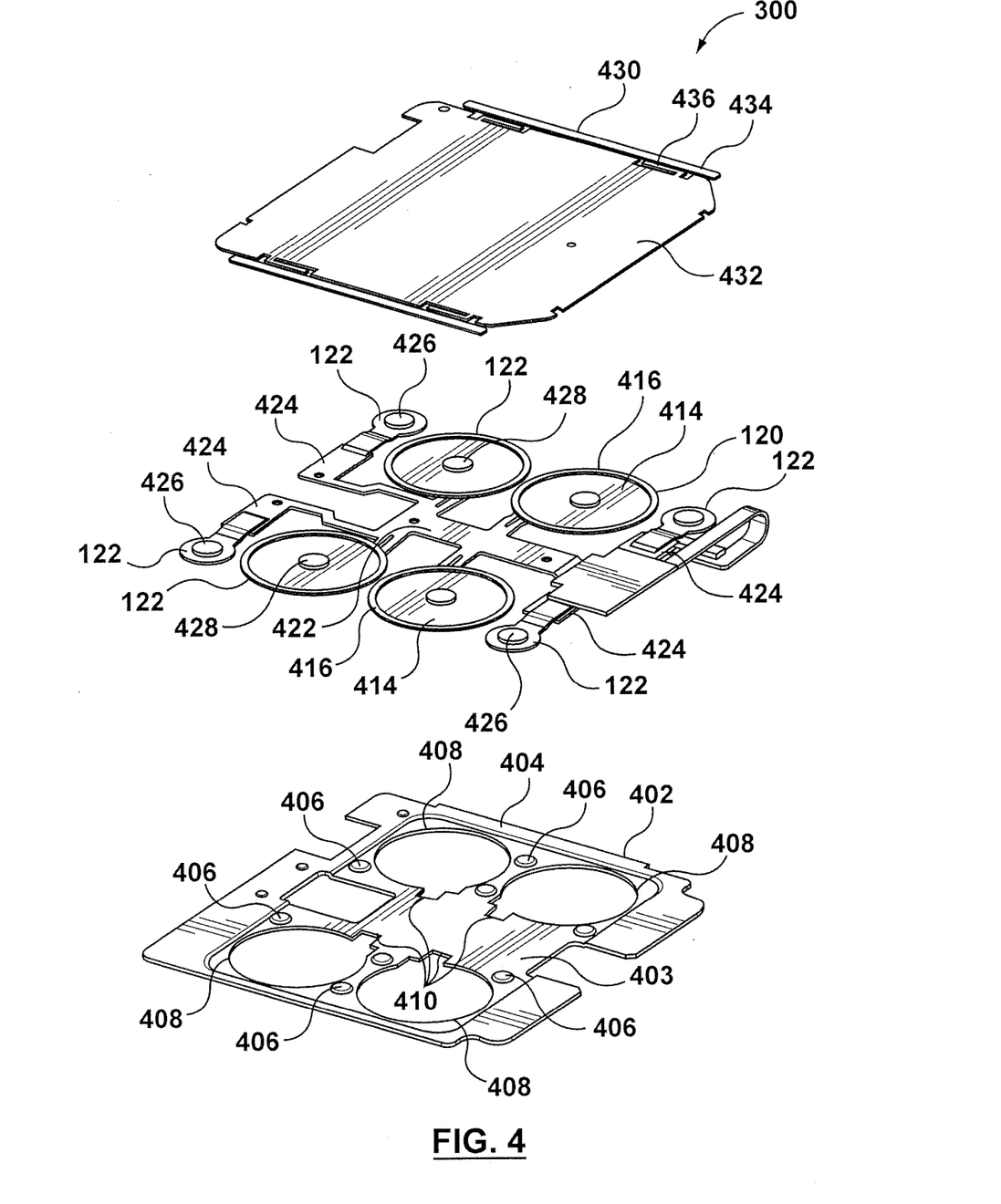
FIG. 4 is an exploded view of the actuator assembly of FIG. 3.
Figure 5:
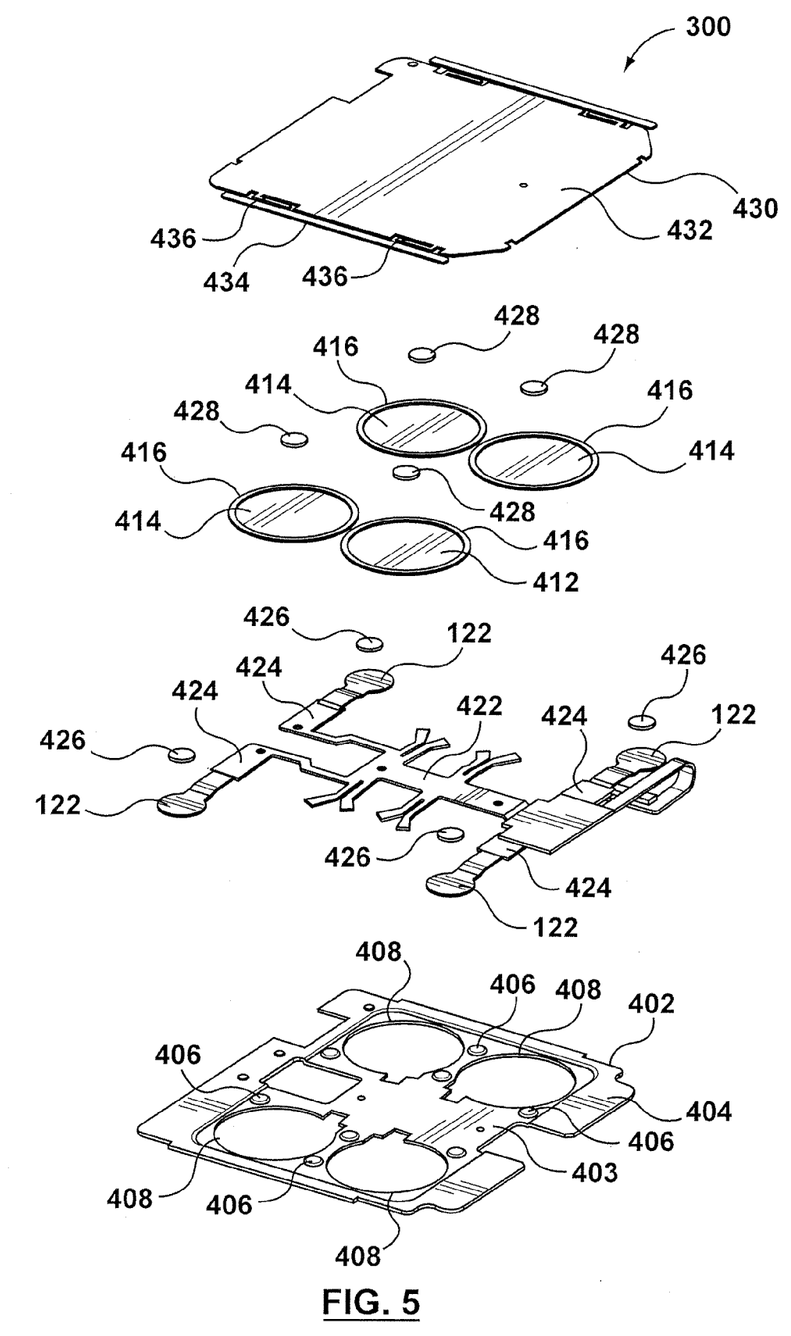
FIG. 5 is a further exploded view of the actuator assembly of FIG. 3.
Figure 6:
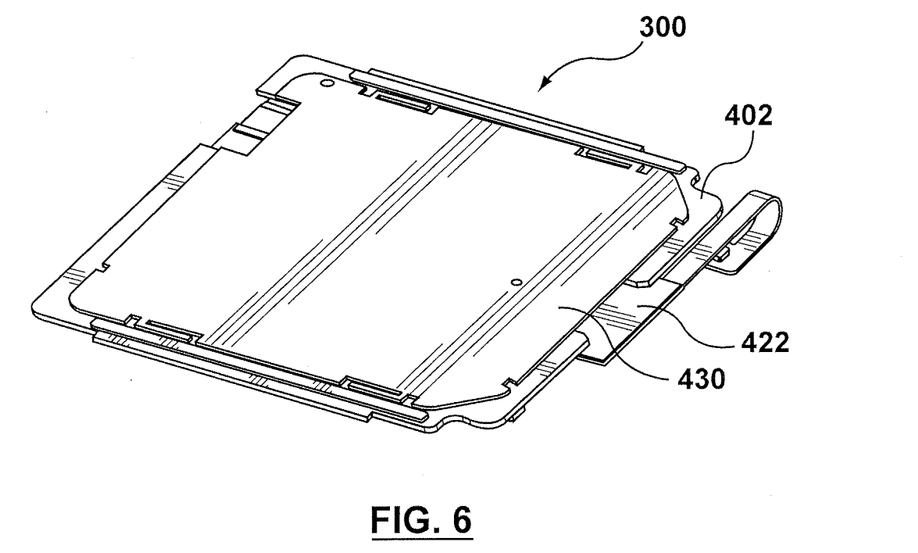
FIG. 6 is a perspective view of the actuator assembly.
Figure 7:
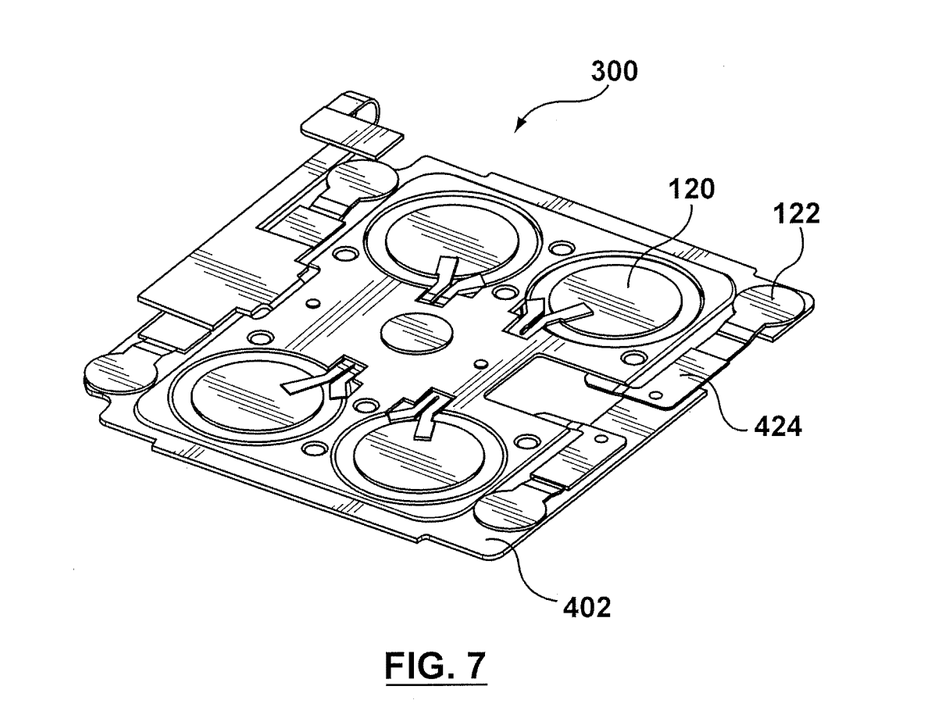
FIG. 7 is another perspective view of the actuator assembly of FIG. 3.

FIG. 3 is an exploded view of portions of the portable electronic device 100 including an actuator assembly 300. The housing 202 of the portable electronic device 100 includes a front 302, that includes the frame 204, and the back 304. The back 304 of the housing 202 includes an opening that may be covered by a plate that is releasably attachable to the back 304 for insertion and removal of, for example, the SIM/RUIM card 138. In the example of FIG. 3, the battery 144 is shown along with a printed circuit board 306. The touch-sensitive display 118 is disposed on the actuator assembly 300 and is available for user interaction through an opening, defined the by frame 204, in the front 302 of the housing 204.

Referring now to FIG. 4 through FIG. 7, various views of the actuator assembly 300 are shown. The actuator assembly 300 includes, for example, four actuators 120, which in the present embodiment are piezoelectric disk actuators. Different numbers of actuators 120 may be utilized in other embodiments. The actuators 120 are supported by a support tray 402 that is generally rectangular in shape. The support tray 402 includes a base 403 with a lip 404 that protrudes from one side of the base 403 and extends generally around the base 403. The lip 404 extends only partly around the base 403 as a break in the lip 404 is provided for connection of a flexible printed circuit board to two force sensors 122 near one end of the support tray 402, as described below. A cut-out portion in the support tray 402 is utilized for connection of the flexible printed circuit board to two additional force sensors 122 near an opposing end of the support tray 402.

Four apertures 408 extend through the support tray 402. Each aperture 408 is located near a respective corner of the base 403. The apertures 408 correspond with the locations of the actuators 120, referred to below. The apertures 408 include an additional cut-away tab 410 for connection to the flexible printed circuit board. A margin of the base 403 around each of the four apertures 408 provides a seat for the respective actuator 120. In the present example, the apertures 408 are generally circular so as to correspond to the shape of the piezoelectric disks 414 described below. Other shapes are possible depending on the shape and configuration of the piezoelectric disks 414.

In addition to the apertures 408, stops 406 are formed in the support tray 402. The stops 406 project from the base 403, protruding in the same direction that the lip protrudes. In the present example, the stops 406 are generally cylindrical and are adjacent the four apertures 408 that provide seats for the actuators. Eight stops 406 are utilized to limit bending forces on the actuators 120, caused by an externally applied force on the touch-sensitive display 118.

The support tray 402 is formed of metal such as stainless steel. Stainless steel provides the required strength for the support tray 402 while allowing it to remain relatively thin. Other materials may be used to construct the support tray 402 in other embodiments. Additional holes in the support tray 402 are provided for alignment with holes in other components of the actuator assembly 300.

Each actuator 120 includes a piezoelectric disk such as a PZT ceramic disk 414 adhered to a metal substrate 416 of larger diameter than the piezoelectric disk 414 for bending when the piezoelectric disk 414 contracts diametrically as a result of a buildup of charge at the piezoelectric disk 414. The metal substrate 416 of the actuator 120 is supported on the margin of the base 403 around each of the four apertures.

Conductive tape may be utilized to adhere each piezoelectric disk 414 of each actuator 120 to a flexible printed circuit board 422. The flexible printed circuit board 422 includes conductive traces that are electrically connected to the piezoelectric disks 414 to connect the actuators 120 to, for example, the printed circuit board 306 of the portable electronic device 100. The flexible printed circuit board 422 also includes legs 424 that extend to an opposing side of the support tray 402 through the break in the lip 404 near one end of the support tray 402 and through the cut-out portion near the opposing end of the support tray 402. Each of four force sensors 122 is connected to a respective leg 424 of the flexible printed circuit board 422. In the present example, the force sensors 122 comprise force-sensing resistors and are attached to a backside of the lip 404 of the support tray 402 by resilient plungers 426 that are disposed between the force sensors 122 and the support tray 402. The force sensors 122 are attached, via the plungers 426 to a backside of the lip 404 of the support tray 402 by a non-conductive adhesive such that the actuators 120 are disposed on one side of the support tray 402 and the force sensors 122 are laterally spaced from the force sensors 122 and are disposed on an opposite side of the support tray 402. The plungers 426 are resilient plungers of, for example, silicone. Four additional plungers 428 are disposed on the actuators 120, with a respective plunger 428 on each actuator 120. The additional plungers 428 are also resilient and may be, for example, silicone. The force sensors 122 may be preloaded, between the actuator assembly 300 and a base or other support within the housing 202 that provides a base for the actuator assembly 300, to thereby control the preload on the force sensors 122 separate of the preload on the actuators 120.

Still referring to FIG. 4 through FIG. 7, a cover 430 covers a portion of the flexible printed circuit board 422 and the actuators 120 and is coupled to the support tray 402. The cover 430 includes a generally rectangular inner sheet 432 with two side rails 434 on opposite sides of the inner sheet 432. The inner sheet 432 is spaced from each side rail 434 by a respective intermediate gap. Each intermediate gap is interrupted by resiliently flexible arms 436 that join the inner sheet 432 to the side rails 434. The arms 434 form a jog, such that the location at which each of the arms 434 joins the inner sheet 432 is offset from alignment with the location that the arm 434 joins one of the side rails 434, to facilitate movement of the inner sheet 432 relative to the side rails 434. The inner sheet 432, side rails 434 and resiliently flexible arms 436 may be integral portions of a sheet.

The inner sheet 432 includes alignment holes for aligning the cover 430 with the support tray 402. In the present example, the cover 430 is a metal sheet of, for example, spring steel to facilitate grounding of the touch-sensitive display 118 that is disposed on the cover 430. The side rails 434 are coupled to the support tray 402 by, for example, spot welding the side rails 434 to the lip 404 of the support tray 402. Alternatively, the cover 430 may form a mechanical interlock with the support tray 402. The inner sheet 432 is movable relative to the side rails 434 and the support tray 402 for moving the touch-sensitive display when the actuators 120 are actuated. The cover 430 facilitates pre-loading of the actuators 120 during production of the actuator assembly 300 such that a bending force acts on the actuators 120, and the actuators 120 provide a spring force in return, when the actuators 120 are not charged and the actuator assembly 300 is in a rest position.

The touch-sensitive display 118 is an assembly of components including the LCD display 112, the overlay 114 and controller 116 (shown in FIG. 1). The touch-sensitive display 118 may be a capacitive touch-sensitive display, for example, and a user's touch on the touch-sensitive display may be determined by determining the X and Y location of the touch with the X location determined by a signal generated as a result of capacitive coupling with a touch sensor layer and the Y location determined by the signal generated as a result of capacitive coupling with another touch sensor layer. Each of the touch-sensor layers provides a signal to the controller 36 that represents the respective X and Y touch location values. Thus a feature such as a virtual button or other feature displayed on the touch-sensitive display 118 may be selected by a mapping of the touch location to a feature on the touch-sensitive display 118.

The touch-sensitive display 118 is coupled to the inner sheet 432. The actuator assembly 300 acts on the touch-sensitive display 118 such that when the actuators 120 are actuated, a force is transmitted from the actuators 120, through the cover 430 and to the touch-sensitive display 118, to move the touch-sensitive display 118 relative to the back 304 of the housing 202 of the portable electronic device 100.

A charge applied to the piezoelectric disks 414 of the actuators 120 results in the piezoelectric disk 414 shrinking diametrically, causing the metal substrate 416 and therefore the entire actuator 120, to bend and apply a force to the inner sheet 432 of the cover 430. Because the inner sheet 432 is moveable relative to the support tray 402, the inner sheet 432 may be moved away from the support tray 402 as the resiliently flexible arms 436 are flexed. The touch-sensitive display 118 may be moved away from the support tray 402, and thus, away from the back 304 of the housing 202 of the portable electronic device 100. The removal of the charge, causes the actuators 120 to return to the rest position and the resiliently flexible arms 436 facilitate movement of the inner sheet 432 to return to the rest position. Thus, the touch-sensitive display 118 is moved back to the rest position. The actuators 120 are connected through the flexible printed circuit board 416 to, for example, the printed circuit board of the portable electronic device 100 and may be controlled by drive circuitry connected to the processor 102 or other microprocessor.

The force sensors 122 are utilized to determine a value related to an applied force by a user touch on the touch-sensitive display 118 as a force applied to the touch-sensitive display 118 is translated to the force sensors 122. The actuators 120 may be controlled to provide movement of the touch-sensitive display 118 in response to detection of an applied force, on the touch-sensitive display 118, that meets or exceeds a force threshold.

The mechanical work performed by the actuators 120 may be controlled to control the force and movement of the touch-sensitive display 118. Fluctuations in mechanical work performed as a result of, for example, temperature, may be reduced by modulating the current to the actuators 120 to control the charge. A piezoelectric driver (not shown) is connected to the piezoelectric disks 414 for controlling a charge of the piezoelectric disks 414. An increase in the charge increases the force on the touch-sensitive display 118 away from the support tray 402 and a decrease in the charge decreases the force on the touch-sensitive display 118, facilitating movement of the touch-sensitive display 118 toward the base 82. In the present example embodiment, each of the actuators 120 is controlled equally and concurrently. It will be appreciated that the piezoelectric actuators may be controlled separately, however. The portable electronic device 100 is controlled generally by modulating a force on the touch-sensitive display 118 in response to detection of an applied force on the touch-sensitive display 118.

Figure 8:
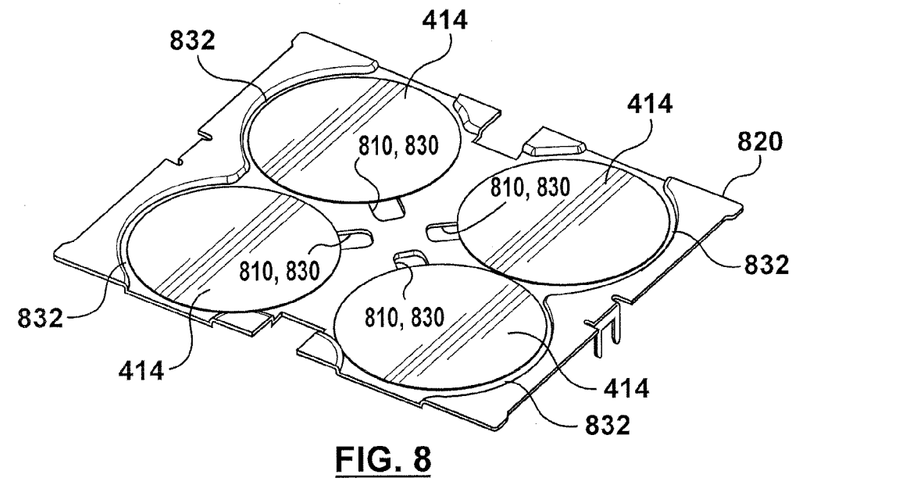
FIG. 8 is a perspective view of a support tray for an actuator assembly in accordance with one example embodiment, the actuator assembly including piezoelectric disks and an insulator for the piezoelectric disks.
Figure 9:
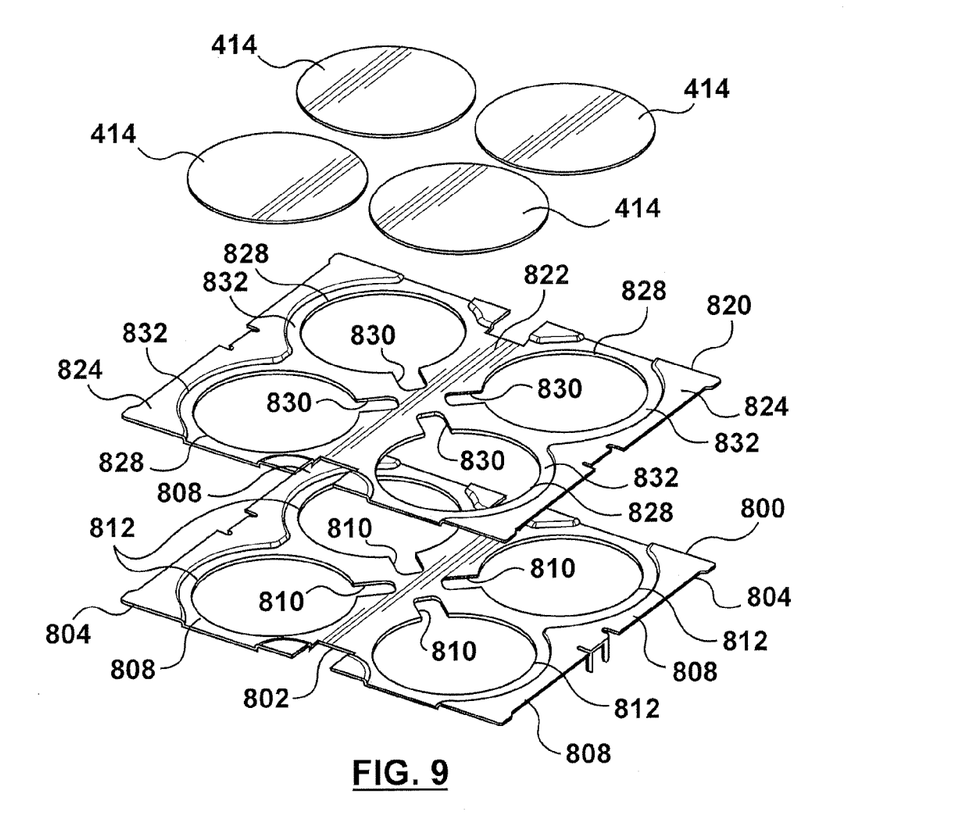
FIG. 9 is an exploded perspective view of the support tray of FIG. 8.
Figure 10:
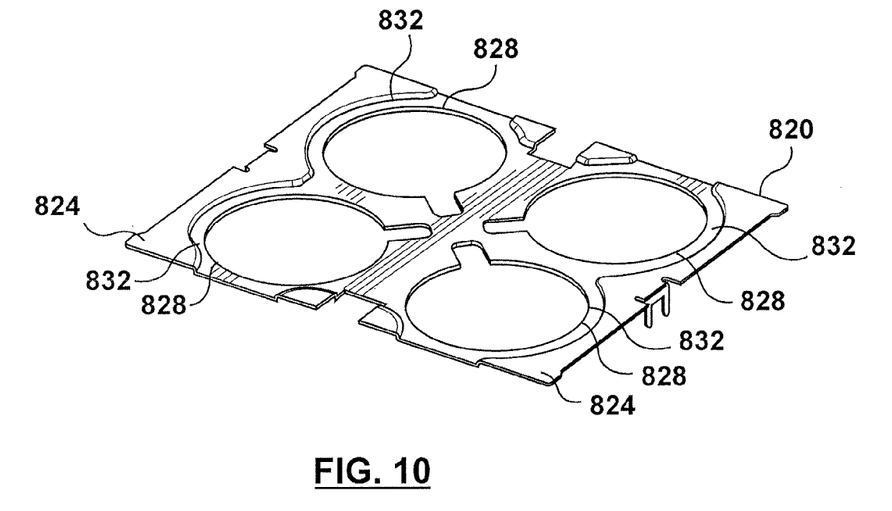
FIG. 10 is a perspective view of the support tray of FIG. 8 with the piezoelectric disks removed.

FIGS. 8 to 10 show an electrical insulator 820 for a support tray 800 for an actuator assembly, such as the actuator assembly 300 shown in FIGS. 4 to 7, in accordance with one example embodiment. To avoid obscuring the details of the insulator 820, only the piezoelectric disks 414 of the actuator assembly 300 are shown. The interaction of the insulator 820 with the other parts of the actuator assembly 300 will be understood to persons skilled in the art upon review of the present disclosure.

The support tray 800 is similar to the support tray 402 described above in connection with FIGS. 4 to 7. The support tray 800 differs in the configuration of the apertures and cut-away tabs, and in the omission of stops 406. As best shown in FIG. 9, the support tray 800 includes a base 802 with an interrupted lip 804 that protrudes from one side of the base 802 and extends around parts of the base 802. In the shown example, the lip 804 extends around the ends of the support tray 800 as well as portions of the sides of the support tray 800. The lip 804 extends only partly around the base 802 as breaks in the lip 804 are provided. The breaks may be used, for example, for connecting the support tray 800 to the actuator assembly 300, the host portable electronic device 100, or both.

The support tray 800 also defines a plurality of apertures 808 extending through the support tray 800. In the present example, the support tray 800 defines four apertures 808 each located near a respective corner of the base 802, however, in other example embodiments, additional or lesser number of apertures 808 is provided. The apertures 808 correspond with the locations of the actuators 120. The apertures 808 each include a cut-away tab 810 for connection to the flexible printed circuit board. A margin of the base 802 around each of the four apertures 808 provides a seat 812 for the respective actuator 120.

In the present example, the apertures 808 are generally circular so as to generally correspond to the shape of the piezoelectric disks 414. Each seat 812 is also generally circular so to provide annular seats of approximately the same size around each of the four apertures 808. The seats 812, being approximately the same size, provide relatively even support for the piezoelectric disks 414 assisting in providing a relatively uniform tactile feedback response across the actuator assembly 300. In the shown embodiment, the portion of each seat 812 closest to the end of the support tray 800 end or meets a sidewall defined by the lip 804.

Referring to FIG. 8, the insulator 820 is closely fit over the support tray 800 in the present example. The insulator 820 electrically isolates and insulates the metal substrate 416 and the piezoelectric disk 414 from the support tray 800 which is formed of a metal such as stainless steel. As noted above, stainless steel provides the required strength for the support tray 800 while allowing it to remain relatively thin. In some example embodiments, the support tray 800 is constructed of stainless steel having a thickness of approximately 0.3 mm. Other metals may be used to construct the support tray 800 in other embodiments. The insulator 820 is formed of an electrically insulating material which can be a thin plastic material. In some embodiments, the electrical insulator 820 is constructed of an electrically insulating plastic material such as polyethylene terephthalate (PET). Other suitable electrically insulating plastics can be used in other embodiments.

In the present example, the insulator 820 is shaped to closely match the shape of the support tray 800. The insulator 820 includes a base 822 with an interrupted lip 824 that protrudes from one side of the base 822 and extends around parts of the base 822. In the shown example, the lip 824 extends around the ends of the insulator 820 as well as portions of the sides of the insulator 820. The lip 824 extends only partly around the base 822 as breaks in the lip 824 are provided. The breaks may be used, for example, for connecting the support tray 800 to the actuator assembly 300, the host portable electronic device 100, or both.

The insulator 820 also defines a plurality of apertures 828 extending through the insulator 820. The number and location of the apertures 828 in the insulator 820 correspond to the number and location of the apertures 808 in the support tray 800, and the number and location of the actuators 120. The apertures 828 each include a cut-away tab 830 for connection to the flexible printed circuit board. A margin of the base 822 around each of the four apertures 828 provides a seat 832 for the respective actuator 120. The seats 812, 832 support the piezoelectric disks 414 of the actuator assembly 300 as best shown in FIG. 9.

The apertures 828 are generally circular so as to generally correspond to the shape of the piezoelectric disks 414 and the apertures 808 in the support tray 800. Each seat 832 is also generally circular so to provide an annular seat of approximately the same size around each of the four apertures 828. The seats 832, being approximately the same size, provide relatively even support for the piezoelectric disks 414 assisting in providing a relatively uniform tactile feedback response across the actuator assembly 300. In the shown embodiment, the portion of each seat 832 closest to the end of the support tray 800 end or meets a sidewall defined by the lip 824.

The insulator 820 may be formed in a variety of ways. In some embodiments, the insulator 820 is formed using vacuum forming (also known as vacuum molding). During vacuum forming, a sheet of the electrically insulating material such as PET is heated to a forming temperature, stretched onto a mold, and held against the mold by applying a vacuum between the mold and the electrically insulating material sheet. After hardening, the molded part is cut and glued to the support tray 800 using a suitable adhesive or otherwise adhered to the support tray 800. In other embodiments, the molded plastic part may be heated and formed directly on top of the support tray 800.

In other embodiments, the insulator 820 is formed using overmolding. During overmolding, the support tray 800 is placed in a mold and the electrical insulator 820 is molded "over" the support tray 800 using injection molding. The electrically insulating material (e.g. PET) is melted and injected into the mold with the support tray 800, substantially filling the mold cavity. The molten insulating material is then allowed to harden, thereby forming an integrated part in the shape of the mold cavity.

Both vacuum forming and overmolding result in an integrated part comprised of the support tray 800 and insulator 820. The finished part may appear the same regardless of whether it is formed using vacuum forming or overmolding, even though the method of manufacture differs between both methods as described above. It will be appreciated that with vacuum forming the thickness of the material is generally the same through the insulator 820. However, using overmolding the insulator 820 may have different thicknesses in different areas. This may be advantageous in that it allows more material to be provided in some areas, for example to increase local insulating properties where needed. At the same time, it allows less material to be provided in other areas, for example where insulating properties are less important.

In some embodiments, the insulator 820 is constructed of an electrically insulating plastic material using either vacuum forming or overmolding to obtain an insulator 820 having a thickness of approximately 0.1 mm. With a support tray 800 having a thickness of approximately 0.3 mm, which may be constructed of stainless steel, this results in an integrated part having a thickness of approximately 0.4 mm. Different thicknesses may be used in for the support tray 800, insulator 820 or both in other embodiments. For example, the insulator 820 may be thicker than 0.1 mm in other embodiments to increase its insulating properties. As noted above, overmolding the insulator 820 provides more flexibility in terms of thicknesses.

In other embodiments, the insulator 820 may be an electrically insulating coating (not shown) applied to the bottom and optionally sides of the piezoelectric disks 414, or applied to a top and optionally the side wall defined by the lip 804 of the support tray 800. The electrically insulating coating may be an adhesive coating for attaching the piezoelectric disks 414 to the support tray 800. Alternatively, the electrically insulating coating may be a non-adhesive coating with the piezoelectric disks 414 being held in place using mechanical or other means. The electrically insulating coating may be a sprayed coating or painted coating. In yet other embodiments, the electrical insulator 820 may be an electroplated layer of a non-conductive/insulating material formed on the support tray 800 by electroplating.

In yet further embodiments, the electrical insulator 820 may be a non-conductive/insulating tape (not shown) for attaching the actuators 120 to the support tray 800. The tape may be disposed on the support tray 800 and adhered to the support tray 800 and the actuators 120 to electrically isolate the actuators 120 from the support tray 800. The insulating tape may cover the entire support tray 800. In other embodiments, the insulating tape may be limited to the seats 812 of the support tray 800 and optionally the side wall defined by the lip 804 of the support tray 800. Alternatively, the insulating tape may be disposed on the bottom and optionally sides of the actuators 120.

While the piezoelectric disks 414 in the described embodiment are in the shape of circular disks which are supported by annular seats 812, 832 in the support tray 800 and insulator 820, it will be appreciated that piezoelectric elements of other shapes, such as square or rectangular, may be used in other embodiments. In such embodiments, the seats 812, 832 should be complimentarily shaped for supporting the piezoelectric elements and approximately the same size to provide relatively even support for the piezoelectric disks 414. This assists in providing a relatively uniform tactile feedback response across the actuator assembly 300.

Figure 11:
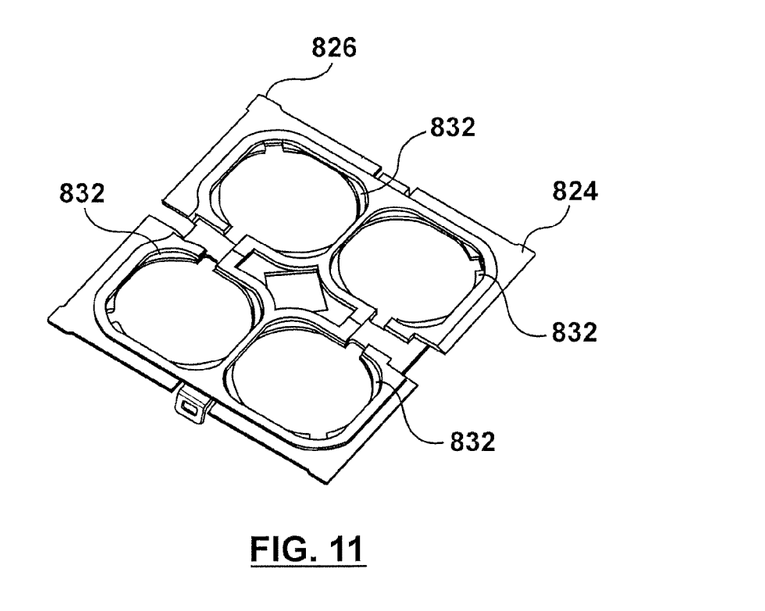
FIG. 11 is a perspective view of a support tray for an actuator assembly in accordance with another example embodiment, including an insulator for piezoelectric disks of the actuator assembly.
Figure 12:
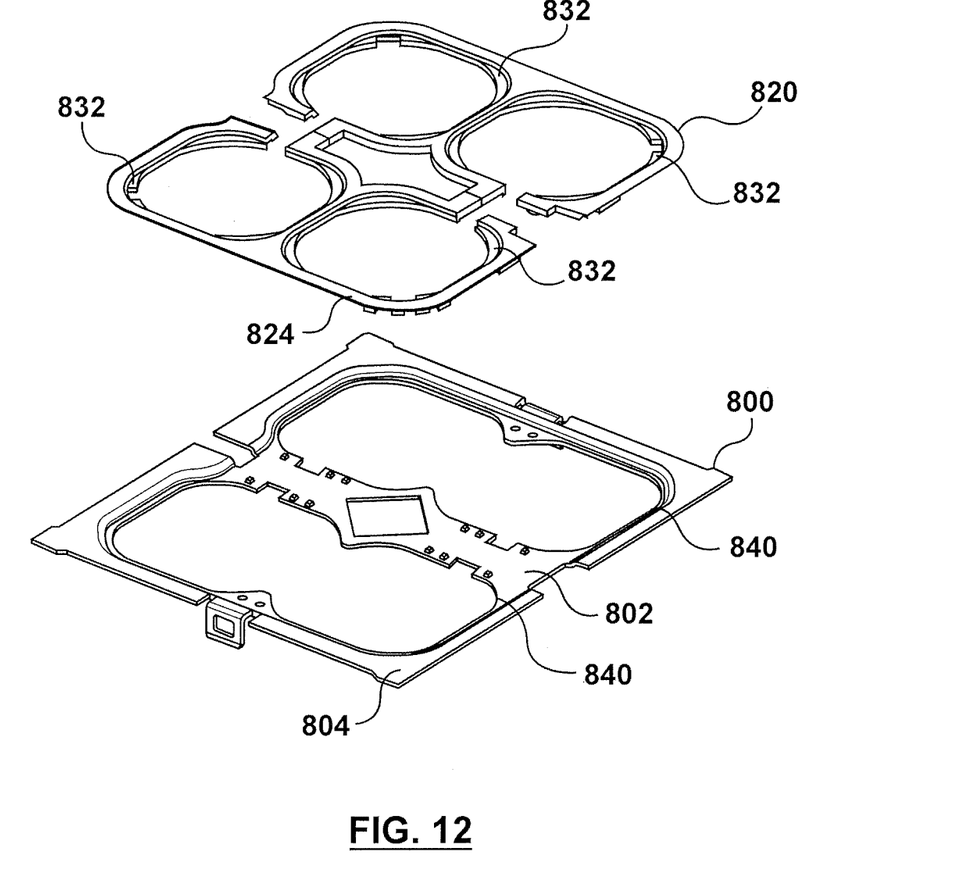
FIG. 12 is an exploded perspective view of the support tray of FIG. 11.

FIGS. 11 and 12 illustrate an alternative embodiment of an insulator for a support tray 800 for an actuator assembly such as the actuator assembly 300 shown in FIGS. 4 to 7, in accordance with one example embodiment. The support tray 800 and insulator 820 in FIGS. 11 and 12 have a different configuration than that shown in FIGS. 8 to 10. The configuration shown in FIGS. 11 and 12 typically requires a thicker insulator 820 compared with the configuration of FIGS. 8 to 10. The different configurations of the support tray 800 and insulator 820 are otherwise similar. In some embodiments, the support tray 800 of FIGS. 11 and 12 are used for an overmolded insulator 820 whereas the support tray 800 of FIGS. 8 to 10 is used for a vacuum formed insulator 820. The differences in the geometry of the support tray 800 shown in FIGS. 11 and 12 compared with that shown in FIGS. 8 to 10 may, at least in part, be due to the use of an overmolded insulator 820 rather than a vacuum formed insulator 820.

As best shown in FIG. 12, the support tray 800 defines a pair of large apertures 840 each used to receive a pair of actuators 120 instead of four apertures 808 each used to receive a single actuator 120. Additionally, the support tray 800 in the alternative example does not include seats 812 for supporting the actuators 120 (e.g., piezoelectric disks 414) or only includes partial seats 812 for supporting the actuators 120. In contrast, the seats 832 defined by the insulator 820 are primarily responsible for supporting the actuators 120.

The present disclosure provides an actuator assembly having electrically insulated actuators 120 such as piezoelectric disks 414. The described actuator assemblies reduce or eliminate short circuits created by the piezoelectric disks 414 contacting the support tray during expansion and contraction in response to changes in its charge. Furthermore, when an insulator formed by vacuum forming or overmolding is used, a thinner actuator assembly can be constructed compared to embodiments utilizing insulating tapes. Additionally, vacuum formed and overmolded insulators avoid the processing and mess associated with applying electrically insulating coatings.

The embodiments shown and described herein illustrate examples only and many modifications may be made. For example, the number of actuators may differ. In one example embodiment, four actuators are located near respective corners of the actuator assembly. In other embodiments, a different number of actuators may be used or the actuators may be located elsewhere, or both. In other embodiments, actuators having a different shape and geometry may be used.

The actuator assembly provides a relatively thin device to provide desirable tactile feedback, for example, to simulate actuation of a dome switch upon touching the touch-sensitive display, confirming receipt of input to the user. The tactile feedback provides a positive response and reduces the chance of input errors such as double entry, decreasing use time and increasing user-satisfaction. Further, the actuator assembly includes a metal actuator sheet that facilitates grounding of the touch-sensitive display that is disposed on the actuator sheet. The actuator sheet facilitates pre-loading of the actuator assembly during production of the actuator assembly. Furthermore, the tolerance of the actuator assembly may be controlled to provide an assembly with tight tolerance. The tolerance of the entire assembly may be controlled at a lower cost by comparison to controlling the tolerance for all the parts individually. The force sensors are laterally spaced from the actuators in the support tray such that a preload on the force sensors, which is the load on the force sensors absent an externally applied force by a user pressing on the touch-sensitive display, may differ from a preload on the actuators. Thus, the preload on the force sensors and the actuators may be separately controlled.

The present disclosure may be embodied in other specific forms without departing from its spirit or essential characteristics. The described embodiments are to be considered in all respects as being only illustrative and not restrictive. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. The present disclosure intends to cover and embrace all suitable changes in technology. The scope of the present disclosure is, therefore, described by the appended claims rather than by the foregoing description. All changes that come within the meaning and range of equivalency of the claims are intended to be embraced within their scope.

The invention claimed is:

1. An actuator assembly for use in an electronic device, comprising:
    a support tray defining an aperture extending through the support tray, the support tray being formed of a conductive metal and including a seat surrounding the aperture;
    an actuator supported on the seat of the support tray, the actuator including a piezoelectric element adhered to a metal substrate larger than the piezoelectric element, the metal substrate bending when the piezoelectric element contracts and expands in response to changes in the charge of the piezoelectric element; and
    an insulator disposed between the metal substrate and the support tray which electrically insulates the substrate from the metal substrate.

2. The actuator assembly of claim 1, wherein the piezoelectric element is a piezoelectric disk and the metal substrate is metal disk having a larger diameter than the piezoelectric disk, the metal substrate bending when the piezoelectric disk contracts and expands diametrically in response to changes in the charge of the piezoelectric disk.

3. The actuator assembly of claim 1, wherein the insulator is formed of an electrically insulating plastic and defines an aperture extending through the insulator and including a seat surrounding the aperture in the insulator, wherein the actuator is supported by the seat surrounding the aperture in the insulator.

4. The actuator assembly of claim 3, wherein the insulator has a shape which closely matches a shape of the support tray.

5. The actuator assembly of claim 3, wherein the insulator and support tray form an integrated part in which the insulator is adhered to the support tray using vacuum forming.

6. The actuator assembly of claim 3, wherein the insulator and support tray form an integrated part in which the insulator is adhered to the support tray using overmolding.

7. The actuator assembly of claim 1, wherein the electrical insulator is an electrically insulating coating.

8. The actuator assembly of claim 1, wherein the electrically insulating coating is an electrically insulating adhesive.

9. The actuator assembly of claim 1, wherein the electrical insulator is an electrically insulating tape adhered to a bottom of the piezoelectric element.

10. The actuator assembly of claim 1, wherein the electrical insulator is electroplated layer of a non-conductive or electrically insulating material formed on the support tray.

11. The actuator assembly of claim 1, further comprising:
    a piezoelectric driver connected to the piezoelectric element for controlling a charge of the piezoelectric element, the piezoelectric element contracting in response to increases in charge and expanding in response to decreases in charge; and
    a cover covering the actuator and coupled to the support tray, a portion of the cover being movable relative to the support tray when the actuator is actuated, the metal substrate of the actuator bending and applying a force to the cover so that the cover moves away from a rest position and away from the support tray in response to increases in charge of the piezoelectric element, and that the cover moves towards the rest position and support tray in response to decrease in charge of the piezoelectric element.

12. The actuator assembly of claim 11, wherein the cover includes first and second portions connected by a flexible connection, the first portion coupled to the support tray and the second portion being the portion that is moveable relative to the support tray.

13. The actuator assembly of claim 1, wherein the support tray defines a plurality of apertures extending through the support tray and including seats surrounding the respective apertures;
   wherein the insulator is formed of an electrically insulating plastic and defines a plurality of apertures extending through the insulator and including seats surrounding the respective apertures in the insulator;
   wherein the actuator assembly comprises a plurality of actuators each actuator being supported on a respective seat of the insulator, each actuator including a piezoelectric element adhered to a metal substrate larger than the respective piezoelectric element, the metal substrate bending when the piezoelectric element contracts and expands in response to changes in the charge of the piezoelectric element.

14. The actuator assembly of claim 13, comprising four actuators located towards respective corners of the support tray, the support tray and insulator each defining four apertures and four seats in locations corresponding to the location of the actuators.

* * * * *

UNITED STATES PATENT AND TRADEMARK OFFICE
CERTIFICATE OF CORRECTION

PATENT NO. : 8,483,771 B2
APPLICATION NO. : 12/854218
DATED : July 9, 2013
INVENTOR(S) : James Carl Infanti, Firmansyah Kuncoko Sulem and Kyung Won Park It is certified that error appears in the above-identified patent and that said Letters Patent is hereby corrected as shown below:

In the Claims

At column 12, lines 13 to 15, Claim 1, "an insulator disposed between the metal substrate and the support tray which electrically insulates the substrate from the metal substrate" should read "an insulator disposed between the metal substrate and the support tray which electrically insulates the support tray from the metal substrate".

Signed and Sealed this
First Day of October, 2013

Teresa Stanek Rea
*Deputy Director of the United States Patent and Trademark Office*